US007127065B1

(12) United States Patent
Depovere et al.

(10) Patent No.: US 7,127,065 B1
(45) Date of Patent: Oct. 24, 2006

(54) WATERMARK EMBEDDING AND DETECTION

(75) Inventors: Geert Florimond Gerard Depovere, Eindhoven (NL); Antonius Adrianus Cornelis Maria Kalker, Eindhoven (NL); Jan Eveleens, Eindhoven (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 1007 days.

(21) Appl. No.: 09/716,907

(22) Filed: Nov. 20, 2000

(30) Foreign Application Priority Data

Nov. 23, 1999 (EP) .................................. 99203914

(51) Int. Cl.
*H04N 7/167* (2006.01)
*G06F 9/00* (2006.01)

(52) U.S. Cl. .................. 380/201; 382/170; 382/100
(58) Field of Classification Search ................ 380/210, 380/54, 201; 382/100, 232, 170; 708/403; 713/176, 167; 375/240.25; 702/191; 324/158.1; 348/207.99; 356/300
See application file for complete search history.

(56) References Cited

U.S. PATENT DOCUMENTS

| | | | | |
|---|---|---|---|---|
| 3,829,218 A | * | 8/1974 | Alyanak | 356/300 |
| 4,477,829 A | * | 10/1984 | Ziman et al. | 348/207.99 |
| 5,260,648 A | * | 11/1993 | Brust | 324/158.1 |
| 5,915,027 A | * | 6/1999 | Cox et al. | 380/54 |
| 5,933,798 A | * | 8/1999 | Linnartz | 702/191 |
| 5,991,426 A | * | 11/1999 | Cox et al. | 382/100 |
| 6,222,932 B1 | * | 4/2001 | Rao et al. | 382/100 |
| 6,226,387 B1 | * | 5/2001 | Tewfik et al. | 382/100 |
| 6,259,801 B1 | * | 7/2001 | Wakasu | 382/100 |
| 6,285,775 B1 | * | 9/2001 | Wu et al. | 382/100 |
| 6,381,341 B1 | * | 4/2002 | Rhoads | 382/100 |
| 6,404,926 B1 | * | 6/2002 | Miyahara et al. | 382/232 |
| 6,505,223 B1 | * | 1/2003 | Haitsma et al. | 708/403 |
| 6,510,233 B1 | * | 1/2003 | Nakano | 382/100 |
| 6,553,127 B1 | * | 4/2003 | Kurowski | 382/100 |
| 6,801,999 B1 | * | 10/2004 | Venkatesan et al. | 713/167 |

FOREIGN PATENT DOCUMENTS

| | | |
|---|---|---|
| EP | 0860997 A2 | 8/1998 |
| EP | 0860997 A3 | 8/1998 |
| GB | 2326556 A | 12/1998 |
| WO | WO9945705 | 9/1999 |

OTHER PUBLICATIONS

"Applications of Digital Wartermarking Technology in Audio Signals" by Changsheng Xu et al., in J. Audio Eng. Soc., vol. 47, No. 10, Oct. 1999, pp. 805-812.

\* cited by examiner

*Primary Examiner*—Ayaz Sheikh
*Assistant Examiner*—Arezoo Sherkat
(74) *Attorney, Agent, or Firm*—Edward W. Goodman; Paul Im

(57) ABSTRACT

In a method and arrangement for embedding and detecting a watermark in an information signal, the embedded watermark ($W_i$) is selected (13) from a plurality of watermarks ($W_1 \ldots W_N$) in dependence upon a property P of the signal. An example of such a property is the distribution of luminance values of the current video image as calculated by an analysis circuit (12). The corresponding watermark detector performs the same operation: the watermark being looked for depends on the same signal property. It is achieved with the invention that the embedded watermark changes from time to time as a function of the information signal content, so that it cannot easily be hacked.

8 Claims, 3 Drawing Sheets

WATERMARK EMBEDDING AND DETECTION

BACKGROUND OF THE INVENTION

1. Field of the Invention

The invention relates to a method and arrangement for watermarking an information signal, for example, an audio or video signal. The invention also relates to a method and arrangement for detecting a watermark in such an information signal.

2. Description of the Related Art

A known method of watermarking a video signal is disclosed in International Patent Application WO-A-99/45705, corresponding to U.S. patent application Ser. No. 09/423,273, filed Mar. 2, 1999. In this method, a watermark pattern is added to the video signal. A watermark detector correlates the same pattern with the suspect signal. If the correlation exceeds a given threshold, the pattern is said to be present. The presence or absence of the pattern represents a single bit of information. The embedded watermark may also carry a multi-bit payload. In the system disclosed in WO-A-99/45705, the payload is represented by a combination of one or more basic patterns and spatially shifted versions thereof. The payload is encoded into the respective shift vectors. The watermark detector correlates each basic pattern with the suspect signal, and determines the spatial positions of the basic patterns with respect to each other. The detector further checks whether said positions constitute a valid payload.

The process of correlating watermark patterns with the suspect signal requires the watermark detector to have locally stored versions of said patterns. In view thereof, it is desired that the watermarking system employs only a few different patterns. The patterns being used are kept secret to the outside world. However, even without knowledge of the patterns, a hacker can compromise the system if he has the relevant embedder at his disposal. He/she may feed an arbitrary input signal to said embedder and subtract the signal from its watermarked version. The difference signal thus obtained resembles the watermark of any other watermarked signal, depending on the perception model used in the watermark embedder at hand. If the difference signal is combined with (e.g., added to or subtracted from) a watermarked signal, the embedded watermark will substantially be cancelled or at least no longer represent a valid payload. In either case, the embedded watermark has been made ineffective.

SUMMARY OF THE INVENTION

It is an object of the invention to provide a more secure method and arrangement for embedding and detecting a watermark in an information signal, even if a hacker has a watermark embedder at his/her disposal.

To this end, the method in accordance with the invention comprises the steps of analyzing a given property of the information signal and determining an actual value of said property, associating different watermarks with distinct values of said property, and embedding the watermark associated with said actual value. The corresponding watermark detection method comprises the steps of analyzing a given property of the information signal and determining an actual value of said property, associating different watermarks with distinct values of said property, and detecting the watermark associated with said actual value.

It is achieved with the invention that the embedded watermark pattern changes from time to time, as a function of the information signal content. Feeding an arbitrary signal to an embedder so as to produce a signal that resembles the watermark, as described above, does not work anymore because the arbitrary signal has different properties. A significant advantage of the invention is that the number of different watermark patterns which the detector must store can be kept much lower. Said number is a result of balancing detector complexity versus security.

There are numerous examples of properties of the information signal that can be used for selecting the watermark pattern to be embedded. The only requirement to be fulfilled is its robustness or invariance with respect to the embedded watermark. Advantageous examples of properties are distinct distributions of luminance values of a video signal, or distinct shapes of the frequency spectrum of an audio signal.

Further aspects of the invention are apparent from and will be elucidated with reference to the embodiments described hereinafter. The examples relate to watermark embedding and detection of video signals, but it will be appreciated that the invention equally applies to audio signals or any other type of multimedia signal.

DESCRIPTION OF THE PREFERRED EMBODIMENTS

Figure 1:
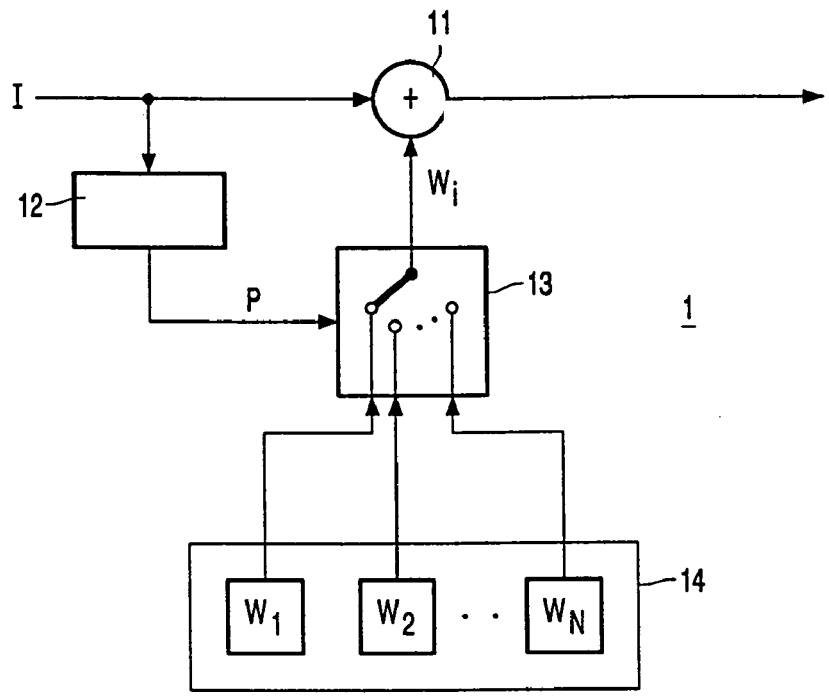
FIG. 1 shows, schematically, a block diagram of a watermark embedder in accordance with the invention.

FIG. 1 shows, schematically, a block diagram of an embodiment of a watermark embedder 1 in accordance with the invention. It will here be assumed that the embedded watermark represents a 1-bit payload. For example, the absence of a watermark indicates that the video signal may freely be copied, whereas the presence of a predetermined watermark denotes that making a copy of the signal is prohibited.

The embedder 1 receives an input video signal I in the form of a sequence of images, and comprises an adder 11 which adds a watermark pattern $W_i$ to each image. The embedder 1 further comprises an image analyzer 12, a selector 13 and a read-only memory 14 in which a plurality of different watermark patterns $W_1 \ldots W_N$ are stored. The analyzer 12 receives the video signal and analyzes a given property P of the video signal as a function of time. The actual value of property P found by analyzer 12 is applied to the selector 13. In response thereto, the selector 13 selects and applies one of the stored watermark patterns $W_1 \ldots W_N$ to the adder 11 for embedding.

The analyzer 12 may take numerous forms. A few examples will be given to provide sufficient teaching to enable a skilled person to design appropriate alternative embodiments. The property being analyzed may be the distribution of luminance values across the image (spatial distribution) or across a sequence of images (temporal distribution). In a first example, the analyzer divides each image into sub-images, and determines which of said sub-images has the highest average luminance. The relevant sub-image number is the actual value of property P. In a second example, the analyzer assigns a "0" to each sub-image having a low average luminance and a "1" to each sub-image having a high average luminance. Each video image is now characterized by an n-bit code, where n is the number of sub-images. The relevant n-bit code is the actual value of property P. The property being analyzed may also be local image activity. Such an analysis can easily be carried out in the frequency domain.

Figure 2:
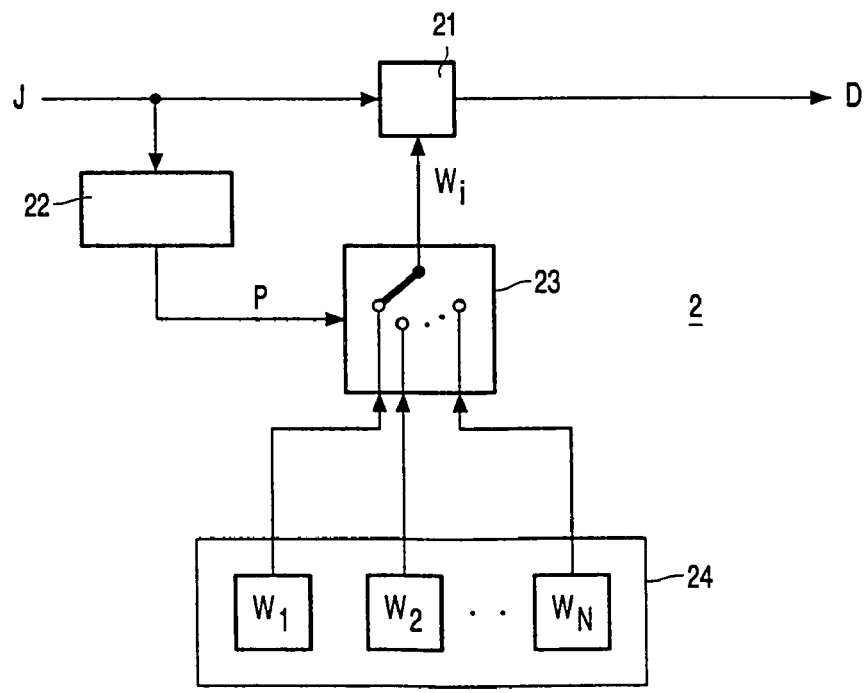
FIG. 2 shows, schematically, a block diagram of a watermark detector in accordance with the invention.

FIG. 2 shows, schematically, a block diagram of a preferred embodiment of a watermark detector 2 in accordance with the invention. The detector 2 receives a suspect video signal J and comprises an image analyzer 22, a selector 23 and a read-only memory 24 which are identical to the corresponding counterparts of embedder 1. Accordingly, the analyzer 22 analyzes the same property P of the video signal, and the selector 23 selects the same watermark pattern W from the stored patterns $W_1 \ldots W_N$, as selected in the embedder 1.

The detector 2 further comprises a correlation circuit 21 which calculates the correlation between each image of the suspect video signal and the applied watermark pattern $W_i$. If the correlation exceeds a predetermined threshold, the selected watermark pattern $W_i$ is said to be present (D=1), otherwise, it is said to be absent (D=0).

The correlation circuit 21 is preferably of a type which performs the correlation for all possible spatial positions of the applied watermark with respect to the image. Such a correlation circuit is disclosed in International Patent Application WO-A-99/45705. The correlation circuit generates a correlation pattern which exhibits a peak for each spatial position of the watermark. WO-A-99/45705 describes that multiple peak positions may represent a payload. However, as mentioned above, the payload in this example is a 1-bit copy control signal. The detection circuit 2 will consider the presence of 2 or more peaks as an invalid payload (D=0).

Figure 3:
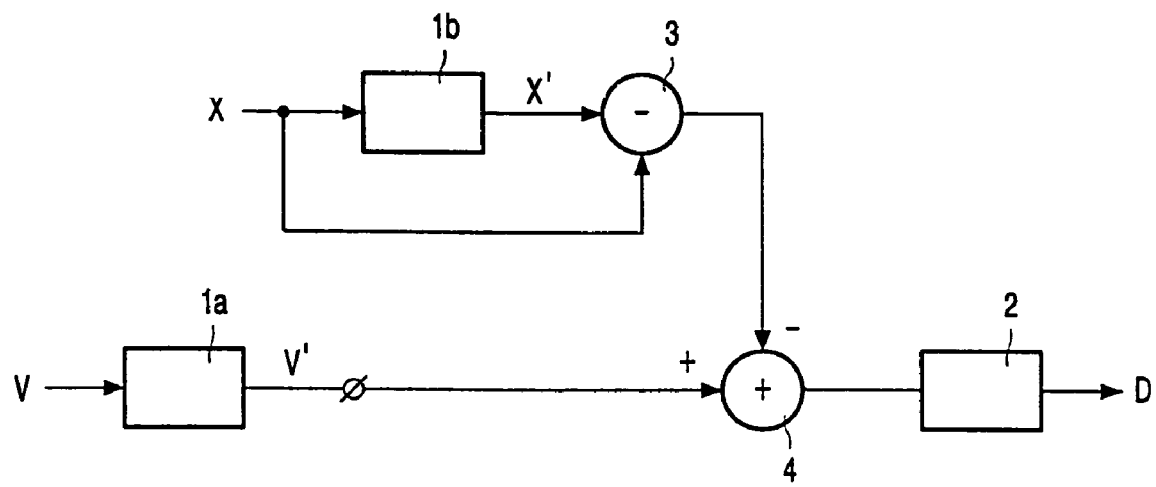
FIG. 3 shows an arrangement illustrating the operation of the watermark embedder and detector.

It is assumed that the watermark patterns $W_1 \ldots W_N$ are secret and can neither be retrieved by interrogating the embedder or detector circuits. As will now be explained with reference to FIG. 3, the invention prevents a hacker from compromising the system when he/she happens to have an embedder at his/her disposal. In FIG. 3, a potential hacker receives a video signal V' having been watermarked by an embedder 1a. The signal V' may be a recorded signal, in which case, the actual embedding took place a long time ago. The embedder 1a is of a type as described above with reference to FIG. 1.

The hacker has an identical embedder 1b at his/her disposal. An arbitrary video signal X is applied to said embedder 1b so as to locally generate a watermarked video signal X'. An adder 3 subtracts the arbitrary signal X from its watermarked version X'. The difference signal (which strongly resembles the embedded watermark pattern) is then combined with (added to or subtracted from) the watermarked signal V' by a further adder 4. The suspect signal V" thus processed is applied to a watermark detector 2 as described above with reference to FIG. 2.

Without the provisions of the invention, both embedders 1a and 1b embed the same watermark in the respective input signals. This results either in a cancellation of the watermark in the suspect signal V" or in an invalid payload due to multiple occurrences of the watermark pattern W at different positions. In both cases, the detector generates an output signal D=0 and the hacking attack is successful.

With the provisions of the invention, the watermark $W_i$ (i=1 . . . N) in signal V' will generally differ from the watermark $W_j$ (j=1 . . . N) in signal X', because the contents of the original video signals V and X are different. The property analysis algorithm of detector 2 responds to the contents of signal V" which is substantially equal to the contents of V. Consequently, the watermark pattern being checked by detector 2 is the watermark pattern $W_i$ which has been embedded by embedder 1a. The detector ignores the additional presence of a different pattern $W_j$, and the hacking attack thus fails.

Figure 4:
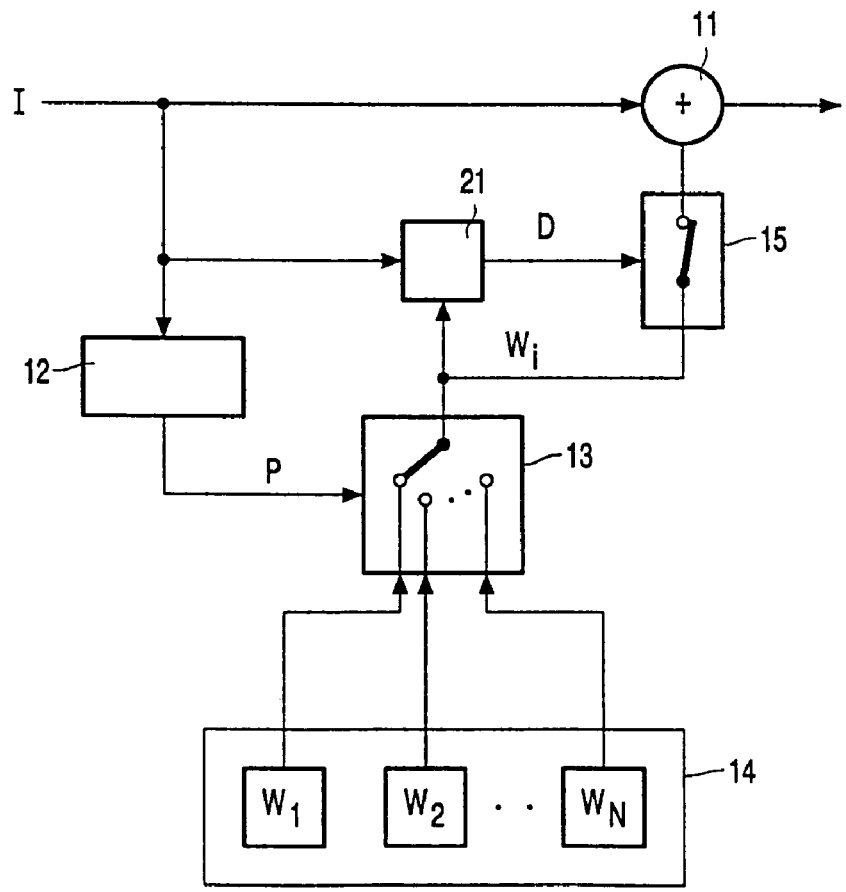
FIGS. 4 and 5 show block diagrams of further embodiments of the watermark embedder in accordance with the invention.

A possible work-around is feeding the watermarked signal V' instead of an arbitrary signal X to embedder 1b, so as to force embedder 1b to select the same watermark $W_i$ as embedder 1a. To avoid this, the embedders 1a and 1b are preferably of a type that refrains from embedding a watermark in a signal that has already been watermarked. FIG. 4 shows a schematic block diagram of such an embedder. The embedder comprises the same adder 11, image analyzer 12, selector 13 and ROM 14 as the embedder 1 shown in FIG. 1. The embedder further comprises the correlation circuit 21 of the detector 2 shown in FIG. 2. The correlation circuit 21 detects whether the input signal I already includes the watermark pattern $W_i$ to be embedded. If that is the case (D=1), a switch 15 is controlled to prevent the watermark pattern $W_i$ from being embedded multiple times.

Figure 5:
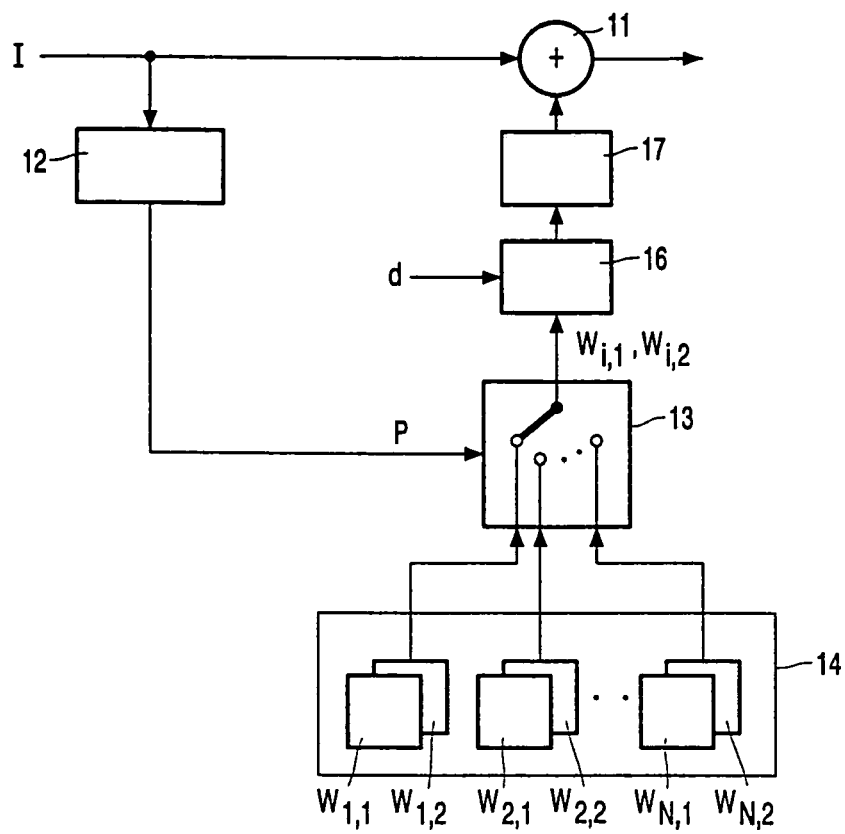

FIG. 5 shows a schematic block diagram of a watermark embedder for embedding a multi-bit payload in the video signal. The embedder comprises the same adder 11, image analyzer 12, selector 13 and ROM 14 as described before with reference to FIG. 1. The ROM 14 now stores a plurality of sets of watermark patterns. The embedder further includes an encoding circuit 16 which receives a selected set i of basic watermark patterns $W_{i,1}, W_{i,2}, \ldots$, and encodes a multi-bit payload d into the relative positions of said patterns. The basic patterns have a relatively small size (e.g., 128×128 pixels). The watermark pattern generated by encoder 16 is subsequently tiled over the image by a tiling circuit 17. The ROM 14 stores different sets of basic patterns for different values of signal property P. The actual set of basic patterns being applied to encoder 16 is controlled by the actual value of property P and changes as a function of time.

Figure 6:
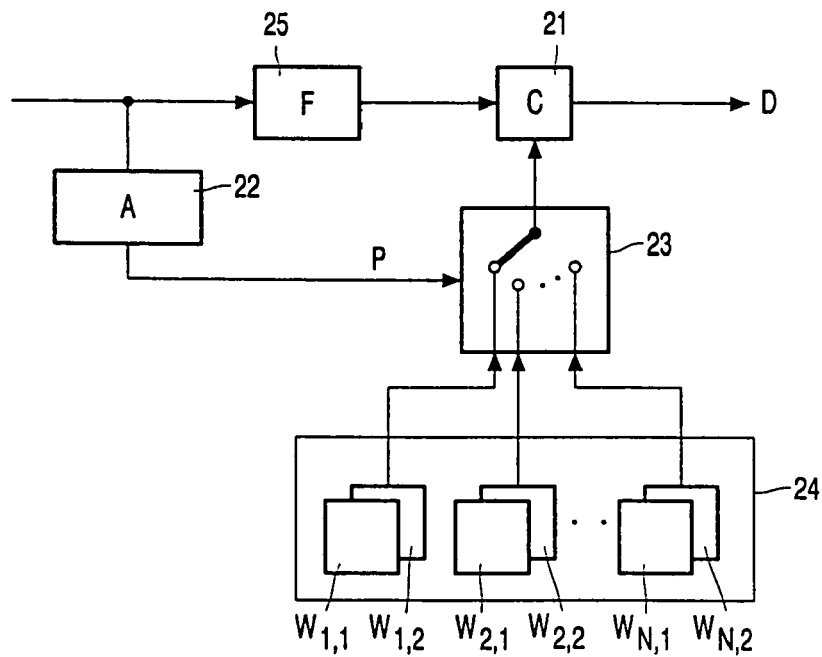
FIG. 6 shows a block diagram of a further embodiment of the watermark detector in accordance with the invention.

FIG. 6 shows the corresponding watermark detector. The detector comprises a folding circuit 25 for folding and storing image segments of 128×128 pixels in a buffer prior to correlation. The detector further comprises the same correlation circuit 21, image analyzer 22, selector 23 and read only memory 24 as described before with reference to FIG. 2. The ROM 24 stores different sets of basic patterns for different values of signal property P. The actual set of basic patterns being applied to the correlation circuit 21 is controlled by the actual value of property P.

It should be noted that the invention is not limited to the watermarking systems described in the embodiments. For example, a watermarking system is known that uses n different watermark patterns, each pattern corresponding to one bit of an n-bit payload. In accordance with this invention, the embedder and detector of such a system include different sets of n patterns. A particular set is then selected in response to the actual value of a signal property.

In summary, a method and arrangement for embedding and detecting a watermark in an information signal is disclosed. The embedded watermark ($W_i$) is selected (13) from a plurality of watermarks ($W_1 \ldots W_N$) in dependence upon a property P of the signal. An example of such a property is the distribution of luminance values of the current video image as calculated by an analysis circuit (12). The corresponding watermark detector performs the same operation: the watermark being looked for depends on the same signal property. It is achieved with the invention that the embedded watermark changes from time to time as a function of the information signal content, so that it cannot easily be hacked.

The invention claimed is:

1. A method of embedding a watermark in an information signal, comprising the steps:

analyzing a given property of the information signal and determining an actual value of said property;

associating different sets of basic watermark patterns in a plurality of sets of basic watermark patterns with distinct values of said property, each set of basic watermark patterns being a combination of two or more basic watermark patterns; and selecting the set of basic watermark patterns from said plurality of sets of basic watermark patterns associated with said actual value for embedding in the information signal.

2. The method as claimed in claim 1, in which the information signal is a sequence of video images, and said analyzing step comprises:

analyzing a spatial or temporal distribution of luminance values, each distinct distribution of luminance values constituting a value of said property of the information signal.

3. The method as claimed in claim 1, in which the information signal is a sequence of audio signal segments, and said analyzing step comprises:

analyzing a shape of the frequency spectrum of said audio segments, each distinct shape of the frequency spectrum constituting a value of said property of the information signal.

4. A method of detecting a watermark in an information signal, comprising the steps:

analyzing a given property of the information signal and determining an actual value of said property;

associating different sets of basic watermark patterns in a plurality of sets of basic watermark patterns with distinct values of said property, each set of basic watermark patterns being a combination of two or more basic watermark patterns; and selecting and detecting the set of basic watermark patterns from said plurality of sets of basic watermark patterns associated with said actual value.

5. The method as claimed in claim 4, in which the information signal is a sequence of video images, and said analyzing step comprises:

analyzing a spatial or temporal distribution of luminance values, each distinct distribution of luminance values constituting a value of said property of the information signal.

6. The method as claimed in claim 4, in which the information signal is a sequence of audio signal segments, and the method further comprises the step;

calculating the frequency spectrum for each segment, each distinct shape of said frequency spectrum constituting a value of said property of the information signal.

7. A watermark embedder for embedding a watermark in an information signal, comprising:

means for analyzing a given property of the information signal and determining an actual value of said property;

means for associating different sets of basic watermark patterns in a plurality of sets of basic watermark patterns with distinct values of said property, each set of basic watermark patterns being a combination of two or more basic watermark patterns; and means for selecting the set of basic watermark patterns from said plurality of sets of basic watermark patterns associated with said actual value for embedding in the information signal.

8. A watermark detector for detecting a watermark in an information signal, comprising:

means for analyzing a given property of the information signal and determining an actual value of said property;

means for associating different sets of basic watermark patterns in a plurality of sets of basic watermark patterns with distinct values of said property, each set of basic watermark patterns being a combination of two or more basic watermark patterns; and means for selecting and detecting the set of basic watermark patterns from said plurality of sets of basic watermark patterns associated with said actual value.

* * * * *